United States Patent Office 3,788,835
Patented Jan. 29, 1974

3,788,835
IRON ORE REDUCTION PROCESS (NU-9)
William E. Lewis and John D. Paynter, Baton Rouge, La., assignors to Esso Research and Engineering Company
No Drawing. Filed Dec. 30, 1970, Ser. No. 102,937
Int. Cl. C21b 1/02
U.S. Cl. 75—26                                    10 Claims

ABSTRACT OF THE DISCLOSURE

A staged fluidized iron ore reduction process is provided in which carbon is deposited on the iron ore in the reduction zone where the major portion of the metallization is effected with the gaseous reductant. After further gaseous reduction to a highly metallized material the reduced ore is held under conditions sufficient to allow the deposited carbon to interact with residual oxides thereby further increasing the metallization of the iron ore.

BACKGROUND OF THE INVENTION

This invention relates to the art of producing metallic or reduced iron by the reduction of particulate oxidic iron ores in direct contact with hot ascending reducing gases in a series of staged fluid beds.

In more advanced iron ore reduction processes, particulate oxidic iron ores are staged in a series of zones and directly contacted with ascending reducing gases which fluidize and reduce the ores. In such reduction processes, temperatures are employed ranging from about 1000° F. up to just below the sintering temperature of the ore. The sintering temperature of the ore generally is about 1800° F.

Typically a preheated oxidic iron ore is fed into the initial or top stage of a fluid bed reactor where it is fluidized and reduced by hot ascending reducing gas to wustite, i.e. a composition approaching FeO. The wustite is discharged into the next lower stage where the ore is fluidized and reduced to a highly metallized product, generally in a plurality of separate beds, by hot ascending reducing gases. The ascending reducing gases which are introduced into the bottom of the reactor are progressively oxidized as the gases proceed through the various stages.

While the commercially preferred procedure is to progressively reduce the iron ore through various stages of oxidation in a series of discrete stages, the ore can nonetheless be fluidized and reduced in a single stage if so desired.

The reducing gases used in fluidized iron ore processes include any conventional reducing gases such as hydrogen, carbon monoxide or mixtures of these and other gases, including inert gases such as nitrogen. In the multistage reduction process, the reducing gases are introduced into the final reduction stage, known as the ferrous reduction stage. The gas is partially oxidized in the final ferrous stage and are sent to the next higher stage. Ultimately the gases are removed from the uppermost stages of the ore reduction process.

In certain multi-stage processes, hydrocarbons are introduced directly into the final ferrous reduction stage to generate the reducing gases in situ. For example, methane is introduced into a bed of ferrous oxide and metallic iron at high temperatures. Methane reacts under these conditions and forms CO and $H_2O$ while simultaneously reducing the ferrous oxide to iron.

In any event, such processes are carried out to the greatest extent practical, i.e., the ores are reduced to the maximum metallizations that can be achieved under practical operating conditions. Generally, the ore is reduced in these processes to metallizations in the range of about 85% to about 90%.

The term "metallization," of course, refers to the percentage of iron in the iron ore that is present as elemental iron.

Although some success has been achieved with the processes described above, modern steelmaking economics require ever increasing metallizations in the ore feed. Consequently, a need exists for an iron ore reduction process which will have all the advantages of fluidized iron ore reduction processes presently known in the art but which will provide a reduced iron product under practical operating conditions that has a maximum metallization above 85%.

SUMMARY OF THE INVENTION

In accordance with the present invention, an improved iron ore reduction process is provided in which a particulate oxidic iron ore is fluidized and progressively reduced in a series of fluidized reduction zones with ascending reducing gases. In the zone in which the major portion of the metallization is to be achieved, carbon is deposited on the ore while the ore is being reduced. Subsequently, the carbon-containing reduced ore is maintained under conditions sufficient to allow the interaction of carbon and residual oxides in the reduced ore to occur thereby further increasing the metallization of the ore.

The zone in which the major portion of the metallization is achieved is that zone in which more than 40% of the total final metallization is effected.

In a preferred embodiment of the present invention a particulate oxidic iron ore is reduced to a composition approaching wustite in an initial ferric reduction zone. The wustite then is reduced in a series of staged fluid-beds in a ferrous reduction zone. In the first bed of the ferrous reduction zone, the ore is reduced to a metallization of about 40 to about 80%. Carbon, in an amount not greater than about 5 wt. percent, is deposited on the ore in the first bed of the ferrous reduction zone during the reduction. Subsequently the ore is reduced in the succeeding beds to a metallization above 80% and finally the reduced ore is held for about 15 to about 60 minutes in an inert atmosphere at about 1300° F. whereby the carbon interacts with the residual oxides.

Deposition of the carbon can be accomplished by a number of techniques known in the art including injecting carbon-forming gases into the ferrous reduction stage at conditions conducive to the deposition of carbon. Among the materials that can be injected into the reduction process to deposit carbon are light hydrocarbons such as methane, naphthas, natural gas, and even intermediate hydrocarbons such as gas oils, and the like, which break down, crack or otherwise liberate free carbon at the temperatures and conditions in the final ferrous reduction stage.

Although generally not more than 5 wt. percent carbon is deposited on the ore, not less than 0.3 wt. percent, and preferably from about 0.4 to about 0.6 wt. percent carbon is deposited.

In a particularly preferred embodiment of the invention the carbon is deposited by contacting the ore with a carbon monoxide containing gas under conditions favorable for the reversion of carbon monoxide to carbon and carbon dioxide.

These and other features of the invention will be better understood by reference to the detailed description which follows.

DETAILED DESCRIPTION OF THE INVENTION

In accordance with this invention a particulate oxidic iron ore is crushed, dried and sized for fluidization and reduction.

The ore which is used in this process may be any of the well known oxide containing ores including but not limited to limonite, specular hematite and earthy hematite.

The drying, grinding and sizing of the ore is accomplished by techniques well known in the art. For example, grinding can be achieved by subjecting the ore to ball milling, gyrotory grinding, rod milling, hammer milling and the like. The sizing of the ore is accomplished generally be screening. Drying can be accomplished, for example, by heating the ore in a kiln to about 300° F.

Typically the ore employed in this process will have particle sizes essentially within 1 to 10,000 microns in size. The average particle size of the ore will range generally from about 40 to about 500 microns in size. Preferably the particle sizes will rang from 6,000 microns in size and finer with no more than 10 wt. percent of the particles below about 44 microns in size.

After drying the ore will contain less than 4 wt. percent water. Preferably after drying the ore will contain less than 2 wt. percent water.

As stated previously, the ore is first dried, ground and sized for fluidization. Then the pulverized and dried material is charged to a preheater where it is heated to about the operating temperature of the initial ferric reducing zone. Generally the temperature of the initial or ferric reduction zone is from about 1100° F. to about 1800° F.

Advantageously preheating is accomplished by fluidizing the ore charge with an effluent gas from a reducing bed while simultaneously combusting any unoxidized reducing gases of the effluent gas stream. However, any suitable means may be employed for preheating the particulate oxidic iron ore to fluid bed reduction conditions.

Once the ore is preheated, it is transferred to the reduction zone where it is fluidized and reduced in a stream of ascending hot reducing gases.

Generally the reduction in the intial reduction zone is conducted at temperatures in the range of about 1000° F. to about 1600° F. and more preferably at a temperature range between about 1100° F. to about 1400° F.

The gas introduced into the intial reduction zone is obtained from the preceding reduction zone. In a preferred embodiment of the present invention, reducing gas is CO containing reducing gas having a CO to $CO_2$ ratio of about 1 to 3 and a $H_2$ to $H_2O$ ratio of about 1 to 3. Preferably the ratio of CO to $CO_2$ is from 1.5 to 2.5 and the ratio of $H_2$ to $H_2O$ is from 2 to 3 in the wustite reduction zone.

The particulate oxidic iron ore is fluidized and reduced in the first or initial reduction zone to a composition approaching wustite, or ferrous oxide.

The wustite, or partially reduced iron ore, is then advanced to the first of a series of fluid-beds in a ferrous reduction zone. Reduction in the ferrous reduction zone is conducted at temperatures ranging from about 1200° F. to about 1600° F. and preferably from about 1300° F. to about 1500° F. In a particularly preferred embodiment of the present invention two fluid-beds are employed in the ferrous reduction zone and the temperature in the upper ferrous reduction bed is maintained in the range of 1325° F. to 1400° F., while the temperature in the lowest ferrous reduction bed is maintained at 1450° to 1550° F.

In a preferred embodiment of this invention the major portion of the total final metallization is effected in the first bed of the ferrous reduction zone. Specifically 40 to 60% of the metallization is effected in this bed. Thus, wustite from the preceding zone is reduced to a metallization up to about 80% in the first ferrous bed. Preferably the partially reduced ore from the ferric reduction zone is reduced in the first ferrous bed to a metallization of from about 40 to about 70%.

Optionally, however, the partially reduced ore can be reduced in the first ferrous bed to a metallization of about 10%, for example, with the major portion of the metallization being effected in a subsequent bed.

While the ore is being reduced in the ferrous reduction zone, carbon is deposited on the ore in the zone or bed where the major portion of metallization is effected. In the preferred embodiment of this invention, carbon is deposited on the ore in the first bed of the ferrous reduction zone while the ore is being metallized in the range of from about 40 to about 80%.

Generally at least 0.3 wt. percent and up to about 5 wt. percent carbon is deposited on the ore in the ferrous reduction zone with about 0.4 to about 0.6 wt. percent carbon being most preferred. Depositions of greater than about 2.0 wt. percent carbon do not improve the metallization of the final product although the carbon may be incorporated for other purposes.

In any event, carbon is deposited on the ore during reduction and in the zone or bed where the major portion of the final ore metallization is achieved.

When a carbon monoxide containing reducing gas is employed in the reduction of the ore, carbon can be deposited on the ore by the well known carbon monoxide reversion reaction as shown in Equation 1.

(1) $$2CO \rightleftarrows C + CO_2$$

Indeed this is the preferred method of depositing the carbon.

Reversion of carbon monoxide to carbon and carbon dioxide, of course, depends upon the temperature and partial pressure of carbon monoxide and carbon dioxide in the system. At temperature below about 850° F., the kinetics of the carbon monoxide reversion reaction is so slow that carbon deposition is insignificant. At very high tempratures, i.e., above 1600° F., the equilibrium for the reversion reaction shifts so far to the left that reversion is achieved only at very high pressures or very high carbon monoxide concentrations.

For any given set of conditions the temperature above which reversion can be achieved can be determined from equilibrium considerations. Thus at equilibrium, the reversion reaction will be governed according to the equation:

$$\frac{P_{CO_2}}{(P_{CO})^2} = K$$

where $P_{CO_2}$ and $P_{CO}$ are the carbon dioxide and carbon monoxide partial pressures respectively, and K is a thermodynamic aquilibrium constant. In terms of molar concentrations this reduces to:

$$\frac{Y_{CO_2}}{(Y_{CO})^2 P_t} = K$$

where $Y_{CO_2}$ and $Y_{CO}$ are the respective mole fractions of carbon dioxide and carbon monoxide and $P_t$ is the total system pressure. Thus, the carbon monoxide reversion will tend to occur only at temperatures for which K is greater than:

$$\frac{Y_{CO_2}}{(Y_{CO})^2 P_t}$$

Values of K at various temperatures which may be involved in fluidized iron ore reduction processes are shown below:

| T, °F.: | K, atm.$^{-1}$ |
|---|---|
| 1100 | 13.218 |
| 1200 | 2.9 |
| 1300 | 0.84 |
| 1600 | 0.041 |

Alternatively, a light hydrocarbon such as methane, naphthas, natural gas or even intermediate hydrocarbons such as gas oils and the like which break down, crack or otherwise liberate free carbon at temperatures in the range of about 1200° F. and higher can be injected into the initial ferrous reduction zone. The cracking of methane as a source of carbon is the least favored method for depositing carbon on the ore. More typically the hydrocarbon injected is selected from the group consisting of gas oils and naphthas.

After the partial reduction and carbon deposition is effected in the first bed, the ore is advanced to the final ferrous reduction bed. The ore is advanced in a continuous or batch manner by well known techniques. Optionally, of course, the ore may be maintained in the same bed in which the carbon had been deposited and further reduced in that bed. This, however, is not the preferred method of practicing the present invention.

The composition of the reducing gas which is introduced into the final bed of the ferrous reduction zone is highly reducing with respect to iron oxides. Typically, a carbon monoxide containing gas is employed. Such gas would contain about 25% CO, 45% hydrogen, 1½% $CO_2$ based on volumes and the remainder nitrogen. The exact makeup of the reducing gas, of course, can be varied so long as it is reducing with respect to wustite. Preferably, however, the CO to $CO_2$ ratio of the gas introduced in this zone will range from about 5 to 20 and the hydrogen $H_2$ to $H_2O$ ratio of this reducing gas will range from about 5 to 15.

The ore is reduced in the final bed to metallization greater than 80% and generally to metallizations of from about 85 to about 90%.

The highly metallized ore from the final bed is withdrawn and then held under conditions favorable for interaction of the carbon with any residual oxides in the reduced ore. Typically, the ore from the final reduction bed is held in the product let-down system at temperatures above 1300° F. and in the range of from about 1300° F. to about 1550° F. in an inert atmosphere for more than 5 minutes. Preferably, the ore is held in a nitrogen atmosphere at the specified temperatures for about 15 to about 60 minutes.

Finally, the ore is withdrawn treated in any conventional manner. For example, the ore can be briquetted and stored or charged directly to a steel-making furnace.

This improved process is based on the discovery that carburization in the stage of the series of staged reduction zones where 40 to 60% of the total metallization is being obtained produces superior overall product metallization.

While not wishing to be limited to any specific theory, by way of explanation, reduction reactions are occurring in the final reduction stage simultaneously. Assuming for the moment that the iron oxide has been reduced to wustite, or FeO, in the preceding or initial stage, the CO and $H_2$ in the reducing gas interact wth the FeO according to the following Equation 2 and 3.

(2) $\quad FeO + CO \rightleftharpoons Fe + CO_2$ (3) $\quad FeO + H_2 \rightleftharpoons Fe + H_2O$ The carbon present in the ore is considered, for discussion purposes, to be present as iron carbide, $Fe_3C$. The carbide interacts with residual wustite according to Equation 4.

(4) $\quad 2FeO + Fe_3C \rightleftharpoons 5Fe + CO_2$

To achieve the maximum benefit from carbon reduction, good dispersion of the carbon in the partially reduced iron ore is essential. According to the present invention, the best conditions for dispersing the carbon within the ore exists under the conditions in the stage of the ferrous reduction zone where the major portion of the total final metallization occurs.

In separate runs conducted pursuant to the detailed description supra, an earthy hematite ore was fluidized and reduced in a two-stage process with a CO containing reducing gas. Two ferrous beds were provided in the final reduction stage. The ore was partially reduced in one run to 80% metallization and in a second run to 42% metallization. Carbon was deposited on the partially reduced ore while the ore was fluidized and reduced to the metallization indicated for the final ferrous bed in Table I below. Subsequently, the ore was removed from the process, held in a nitrogen atmosphere for 45 minutes at a temperature above 1300° F. and finally briquetted. As can be seen from the table below, the metallization of the final product is significantly increased by depositing carbon on the ore in accordance with this invention. When carbon is not deposited on the ore, the briquette has from the same to a slightly lower metallization than that which obtains in the final ferrous reduction bed. (Slightly lower metallizations result from slight back oxidation of the ore.)

TABLE I

|  | Run | |
|---|---|---|
|  | 1 | 2 |
| Percent metallization, 1st ferrous bed | 80.4 | 42 |
| Percent carbon deposited | 0.6 | 0.6 |
| Percent metallization, final ferrous bed | 90.5 | 89.2 |
| Briquette metallization | 91 | 90.4 |
| Increase | 0.5 | 1.2 |

A greater increase in the change from metallization is achieved in accordance with the present invention by increasing the amount of carbon deposited on the ore. This increase is shown in the Table II.

TABLE II

|  | Case | |
|---|---|---|
|  | 1 | 2 |
| Percent metallization, 1st ferrous bed | 80 | 42 |
| Percent carbon deposited | 1.2 | 1.2 |
| Final metallization | 90.5 | 89.2 |
| Briquette metallization | 91.5 | 91.6 |
| Increase | 1.0 | 2.5 |

This invention has been described in terms of the preferred practice of using 2 stages and at least 2 final ferrous reduction beds. A greater number of fluidized reduction beds, or stages may be employed, however. Optionally, although not preferably, substantially similar results can be achieved in a single stage. These and many other variations will be apparent to those skilled in the art and it is intended that the full scope and spirit of the invention be given to the attached claims.

What is claimed is:

1. In a staged fluidized iron ore reduction process wherein a particulate oxidic iron ore is partially reduced in an initial ferric reduction zone with reducing gases and the partially reduced ore is progressively metallized with reducing gases in a series of fluid-beds in a ferrous reduction zone, the improvement comprising: fluidizing and reducing said partially reduced ore in at least one fluid-bed of said ferrous reduction zone to a metallization ranging from about 40% to about 80% while simultaneously depositing from about 0.3 wt. percent up to about 5 wt. percent carbon on said ore; further fluidizing and reducing said ore in at least one final fluid bed of said ferrous reduction zone to a metallization above about 80% and thereafter maintaining said reduced ore in an inert atmosphere at temperatures in the range of from about 1300° F. to about 1550° F. for a time sufficient to allow the deposited carbon to interact with the residual oxides in the ore whereby the residual oxides are reduced and the metallization of the ore is increased.

2. The process of claim 1 wherein said ore is partially reduced to a metallization in the range of 40% to 70% in the first fluid-bed of said ferrous reduction zone and wherein from about 0.3 wt. percent to about 2.0 wt. percent carbon is deposited on the ore.

3. The process of claim 2 wherein from about 0.4 wt. percent to about 0.6 wt. percent carbon is deposited on the ore in said first bed and said ore is reduced in a second final bed to a metallization above about 85%.

4. The process of claim 1 wherein said carbon is deposited on said ore by contacting said ore with a carbon monoxide containing gas under conditions sufficient to cause reversion of carbon monoxide to carbon and carbon dioxide.

5. The process of claim 1 wherein carbon is deposited on said ore by injecting a hydrocarbon into said fluid bed at temperatures of about 1000° F. to about 1400° F.

6. The process of claim 5 wherein said hydrocarbon is selected from the group consisting of gas oil and naphthas.

7. The process of claim 1 wherein said reduced ore is maintained at about 1300° F. in an inert atmosphere for about 15 to about 60 minutes.

8. The process of claim 7 wherein said atmosphere consists essentially of nitrogen.

9. In a fluidized iron ore reduction process wherein a particulate oxidic iron ore is fluidized and progressively reduced in a series of fluidized reduction zones by contact with ascending reducing gases, the improvement comprising:
   simultaneously depositing from about 0.4 wt. percent to about 0.6 wt. percent carbon on said fluidized ore in the zone in which the major portion of the metallization is to be achieved;
   further fluidizing and reducing the ore to a metallization above about 80%; and
   thereafter maintaining said ore in an inert atmosphere at a temperature above about 1300° F. for at least 5 minutes to allow the deposited carbon to interact with the residual oxides contained in the ore whereby the metallization of the ore is increased.

10. A direct iron ore reduction process comprising:
    fluidizing and partially reducing a particulate oxidic iron ore to a composition approaching wustite at temperatures ranging from about 1100° F. to about 1400° F.;
    subsequently fluidizing and reducing said partially reduced ore with reducing gases to a metallization of about 40% to about 70% at temperatures of about 1300° F. to about 1400° F. while simultaneously depositing from about 0.4 wt. percent to about 0.6 wt. percent carbon on said ore;
    further fluidizing and reducing said ore with reducing gases to a metallization above about 80% at temperatures of about 1450° F. to about 1550° F.; and
    thereafter holding said reduced ore in an inert atmosphere at about 1300° F. for about 15 to about 60 minutes to allow the deposited carbon to interact with the residual oxides contained in the ore whereby the metallization of the ore is increased.

References Cited

UNITED STATES PATENTS

| | | | |
|---|---|---|---|
| 3,205,066 | 9/1965 | Robson | 75—34 |
| 3,392,008 | 7/1968 | Ward | 75—26 |
| 3,227,546 | 1/1966 | Johnson | 75—34 |
| 3,328,161 | 6/1967 | Rausch | 75—34 |
| 3,377,156 | 4/1968 | Kalina | 75—26 |

CHARLES N. LOVELL, Primary Examiner

P. D. ROSENBERG, Assistant Examiner

U.S. Cl. X.R.

75—9, 34